United States Patent [19]
Baruschke et al.

[11] Patent Number: 5,992,163
[45] Date of Patent: Nov. 30, 1999

[54] PROCESS AND ARRANGEMENT FOR AN AIR CONDITIONER CONTROL WITH AN EVAPORATOR PROTECTED AGAINST ICING

[75] Inventors: Wilhelm Baruschke, Wangen; Matthias Kies, Steinheim; Karl Lochmahr, Vaihingen/Enz-Horrheim; Joachim Raimann, Stuttgart, all of Germany

[73] Assignee: Behr GmbH & Co., Stuttgart, Germany

[21] Appl. No.: 09/138,374

[22] Filed: Aug. 24, 1998

[30] Foreign Application Priority Data

Aug. 23, 1997 [DE] Germany .............. 197 36 818

[51] Int. Cl.⁶ ..................................... F24B 49/02
[52] U.S. Cl. .................. 62/156; 62/227; 62/157
[58] Field of Search .............. 62/156, 151, 227, 62/228.1, 157, 158, 231, 228.3, 226, 323.4

[56] References Cited

U.S. PATENT DOCUMENTS

| | | | |
|---|---|---|---|
| 4,856,293 | 8/1989 | Takahashi | 62/227 X |
| 4,894,999 | 1/1990 | Kaiju et al. | 62/227 X |
| 5,218,836 | 6/1993 | Jarosch | 62/227 X |
| 5,467,605 | 11/1995 | Hennessee et al. | 62/157 X |
| 5,826,439 | 10/1998 | Baruschke et al. | 62/227 X |

FOREIGN PATENT DOCUMENTS

| | | |
|---|---|---|
| 0128108 | 12/1984 | European Pat. Off. |
| 0505315 | 9/1992 | European Pat. Off. |
| 0557747 | 9/1993 | European Pat. Off. |
| 2848848 | 5/1979 | Germany. |
| 3900548 | 8/1989 | Germany. |
| 19507667 | 9/1996 | Germany. |

OTHER PUBLICATIONS

"Verdampfer–Abtauung—am Beispiel von Heizwärmepumpen," J. Reichelt, Ki Klima, Kälte, Heizung, Feb. 1987, pp. 72–75.

"Automatik in Kälteanlagen: Abtau–Systeme," Günter E. Wegner, Die Kälte und Klimatechnik, Sep. 1988, pp. 394, 396, 398, 400, 402, 404, 409 and 410.

*Primary Examiner*—Harry B. Tanner
*Attorney, Agent, or Firm*—Evenson, McKeown, Edwards, & Lenahan, P.L.L.C.

[57] ABSTRACT

A process and an arrangement for controlling an air conditioner utilize an evaporator protected against icing and a refrigerant circulating system which includes at least one compressor and the evaporator. The evaporator temperature is sensed continuously and the compressor is deactivated when the evaporator temperature falls below a defined switch-off temperature. The compressor is activated again when the evaporator temperature exceeds a defined switch-on temperature which is at least equal to the switch-off temperature. The evaporator temperature gradient is determined by a corresponding control unit from the continuous sensing of the evaporator temperature. The switch-off temperature is variably defined as a function of the determined temperature gradient and is selected so as to rise with a negative evaporator temperature gradient, having an amount which increases, during operating phases with an activated compressor and/or with a falling positive evaporator temperature gradient during operating phases with a deactivated compressor.

15 Claims, 1 Drawing Sheet

PROCESS AND ARRANGEMENT FOR AN AIR CONDITIONER CONTROL WITH AN EVAPORATOR PROTECTED AGAINST ICING

This application claims the priority of German patent application No. 197 36 818.2, filed Aug. 23, 1997, the disclosure of which is expressly incorporated by reference herein.

BACKGROUND AND SUMMARY OF THE INVENTION

This invention relates to a particular process and a particular arrangement for controlling an air conditioner with an evaporator protected against icing.

Processes and arrangements of this type are used particularly in motor vehicles. Icing phenomena on the evaporator are prevented by deactivating the compressor when the evaporator temperature is too low, that is, when the evaporator temperature falls below a defined switch-off temperature. The compressor will be activated again when the evaporator temperature exceeds a given switch-on temperature which is selected to be higher than the switch-off temperature. As a result, a desired switch-off hysteresis is provided which protects the compressor from too frequent switch-off and switch-on operations during protection against icing.

From German Published Patent Application DE 195 07 667 A1, it is known for a process and an arrangement of this type to define the switch-off temperature so that it falls dynamically as a function of the output of a fan assigned to the evaporator and/or of the temperature of the air taken in by the evaporator fan with a rising fan output or a rising intake temperature. In addition, it is suggested to define the switch-on hysteresis so that it is constant or decreases with a higher fan output and/or a higher intake air temperature. Such a dynamic adaptation of the switch-off temperature and, optionally, also of the switch-on temperature permits the output potential of the air conditioner to be utilized better than at a fixedly defined switch-off temperature. The reason for this is that, in the latter case, the temperature must be selected to be sufficiently high so that icing of the evaporator is reliably avoided also in critical operating points of the system, which, in many other less critical operating conditions, leads to an unnecessarily early compressor switch-off.

Another process and another arrangement of the initially mentioned type with a dynamic protection against icing is described in European Published Patent Application EP 0 557 747 A2. The suction pressure of the compressor, or its rate of increase after deactivating the compressor, which consists of disengaging an electrically controllable coupling by which the compressor is mechanically coupled with the driving engine of a motor vehicle, is used as a relevant measurable variable for dynamic protection against icing in this process and arrangement. In this case, the compressor suction pressure corresponds to the refrigerant pressure at the evaporator outlet. The compressor is deactivated when the suction pressure falls below a defined switch-off pressure, and is activated again when the suction pressure rises above a defined switch-on pressure which is higher than the switch-off pressure. Simultaneously, the time period from the switch-off point in time until the compressor is switched on again is measured. The switch-off pressure will then be updated in a variable manner as a function of this measured time period, in which case the pressure is selected to be lower as the measured time period becomes longer.

The present invention addresses the technical problem of providing a process and an arrangement of the initially mentioned type and provides a way in which, in a comparatively simple manner, icing of the evaporator is reliably avoided and the output potential of the air conditioner is utilized as well as possible.

This invention solves this problem by providing a particular process for controlling an air conditioner with an evaporator protected against icing and a refrigerant circulating system which includes at least one compressor and an evaporator. The process includes the steps of continually sensing an evaporator temperature, deactivating the compressor when the evaporator temperature falls below a defined switch-off temperature, and activating the compressor again when the evaporator temperature exceeds a defined switch-on temperature which is higher than or equal to the switch-off temperature. An evaporator temperature gradient is determined from continuously sensing the evaporator temperature during operating phases with a deactivated compressor and/or an activated compressor, and the switch-off temperature is variably defined as a function of the evaporator temperature gradient determined so that the switch-off temperature is selected to rise with a negative evaporator temperature gradient, with an amount which increases, during operating phases with an activated compressor and/or with a falling positive evaporator temperature gradient during operating phases with a deactivated compressor.

A particular arrangement for controlling an air conditioner with an evaporator protected against icing and a refrigerant circulating system which includes at least one compressor and an evaporator is also provided. The arrangement includes an evaporator temperature sensor and a control unit to which evaporator temperature information is supplied by the evaporator temperature sensor, which deactivates the compressor when the evaporator temperature falls below a defined switch-off temperature, and which activates the compressor again when the evaporator temperature exceeds a switch-on temperature which is at least equal to the switch-off temperature. The control unit determines, from the continuously supplied evaporator temperature information, an evaporator temperature gradient during operating phases with a deactivated and/or activated compressor and variably defines the switch-off temperature as a function of the evaporator temperature gradient determined. The switch-off temperature rises with a negative evaporator temperature gradient, whose amount increases, during operating phases with an activated compressor and/or with a falling positive evaporator temperature gradient during operating phases with a deactivated compressor.

In the process, the evaporator temperature is sensed continuously and, from the temperature, the evaporator temperature gradient is determined during operating phases with a deactivated and/or an activated compressor. The compressor is deactivated when the evaporator temperature falls below a switch-off temperature which is variably defined as a function of the determined evaporator temperature. In particular, when using the evaporator temperature course during operating phases with an activated compressor, during which the evaporator temperature gradient is negative, the switch-off temperature is selected in a rising manner with an evaporator temperature gradient having an amount which increases. In contrast, when using the evaporator temperature course during operating phases with a deactivated compressor, during which the evaporator temperature gradient is positive, the switch-off temperature is selected so as to rise with a falling evaporator temperature gradient. By this approach, a true evaporator temperature control is implemented with respect to dynamic evaporator icing protection since the evaporator temperature course is fed back for determining the respective optimal compressor switch-off temperature. The arrangement is suitable for implementing this process, for the purpose of which the corresponding control unit has a suitable design.

By using the evaporator temperature as a relevant measurable variable, a dynamic icing protection control can be implemented comparatively easily. In particular, sensing of the evaporator temperature gradient, while the required precision of the icing protection measurement is given, is easier than, for example, sensing the rate of change of the compressor suction pressure. Another advantage is the option of also being able to use, for setting the switch-off temperature, the evaporator temperature gradient during the active compressor operating phases; this evaporator temperature gradient may be used either alone or in conjunction with an additional analysis of this evaporator temperature gradient during deactivation phases of the compressor. By using both types of information, as required, a redundancy or an increased precision can be provided.

In a further developed process, the switch-on hysteresis, that is, the difference between the switch-on temperature and the switch-off temperature, is also defined to be variable as a function of the determined evaporator temperature gradient such that it rises when the amount of the negative evaporator temperature gradient increases or the amount of the positive evaporator temperature gradient falls, which also applies for the switch-off temperature. In the case of a slowly falling evaporator temperature during a compressor activation phase, the switch-off temperature can therefore be lowered and the switch-on hysteresis can be selected to be small without having the evaporator ice up. In contrast, when a rapidly falling evaporator temperature is present while the compressor is activated, which corresponds to a low air conditioner load, a sufficiently high switch-off temperature is set with a larger switch-on hysteresis in order to prevent icing of the evaporator.

Advantageous embodiments of the invention are described in the following with reference to the drawings.

DESCRIPTION OF THE PREFERRED EMBODIMENTS

Figure 1:
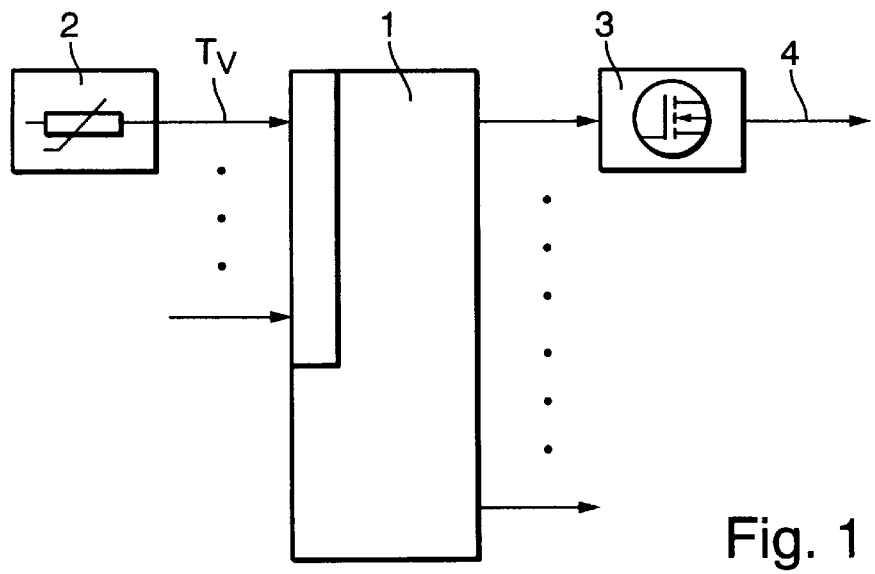
FIG. 1 is a block diagram of an arrangement for the control of an air conditioner in which the evaporator is protected against icing-up.

The arrangement for controlling an air conditioner installed, for example, in a motor vehicle in which the evaporator is protected from icing contains a control unit 1 as central element, for example, in the form of a microcomputer. In addition, the arrangement has a sensor 2 for measuring the evaporator temperature Tv which has an output signal fed to the control unit 1. Furthermore, a semiconductor power switch 3 is provided which is controlled by the control unit 1 by way of a corresponding output of the control unit 1. By means of the current signal 4 of the power switch 3, a magnetic coupling is controlled by which a compressor is activated and deactivated; this compressor, like an evaporator and additional usual components, is part of a refrigerant circulating system of the conventionally constructed air conditioner. The control unit 1 is preferably also used for controlling or regulating the additional air conditioner functions which are not of interest here and for this purpose has corresponding other signal inputs and signal outputs which are not described here in detail.

The control unit 1 therefore controls the operation of the compressor by way of the power switch 3 and the magnetic coupling switched by this power switch 3. In this case, for protecting the evaporator against icing, special measures are provided which will be explained in detail in the following; otherwise, the compressor operating control takes place in a conventional manner. The control unit 1 always deactivates the compressor for evaporator icing protection by way of the semiconductor switch 3 and the magnetic coupling whenever the evaporator temperature $T_v$ measured by the evaporator temperature sensor 2 falls below a defined switch-off temperature $T_{off}$ stored in the control unit 1. Only when the evaporator temperature $T_v$ has subsequently again exceeded a defined switch-on temperature $T_{on}$, also stored in the control unit 1, will the control unit 1 activate the compressor again by corresponding controlling of the semiconductor switch 3 and thus of the magnetic coupling of the compressor. The switch-on temperature $T_{on}$ is selected by a switch-on hysteresis $T_H = T_{on} - T_{off} \geq 0$ larger than the switch-off temperature $T_{off}$. This prevents too frequent compressor switch-on and switch-off operations.

After deactivating the compressor, the evaporator temperature $T_v$ will decrease further to a temperature minimum $T_{min}$ before rising because of the deactivated air conditioner. Analogously, when the compressor is switched on again, the evaporator temperature $T_v$ will rise further to a temperature maximum $T_{max}$ before it falls because of the effect of the activated air conditioner. Naturally, at a low air conditioner load, the temperature minimum $T_{min}$ is situated farther below the switch-off temperature $T_{off}$ than at a high system load, while, inversely, the temperature maximum $T_{max}$ at a high system load will be situated farther above the switch-on temperature $T_{on}$ than at a lower system load. If the switch-off temperature $T_{off}$ were defined in a fixed manner, then it would have to be defined at a relatively large distance from the point of potential evaporator icing in order to ensure that, at a very low system load, the temperature minimum $T_{min}$ reached by the evaporator temperature $T_v$, after respective deactivating of the compressor, is above the icing limit. For operations at a high system load, in which the temperature minimum $T_{min}$ of the evaporator temperature $T_v$ is only a little below the switch-off temperature $T_{off}$, such a large distance of the switch-off temperature $T_{off}$ from the icing point is actually not required. As a result, when the switch-off temperature is defined in a fixed manner, in these operations, the efficiency of the air conditioner is not fully utilized.

Figure 2:
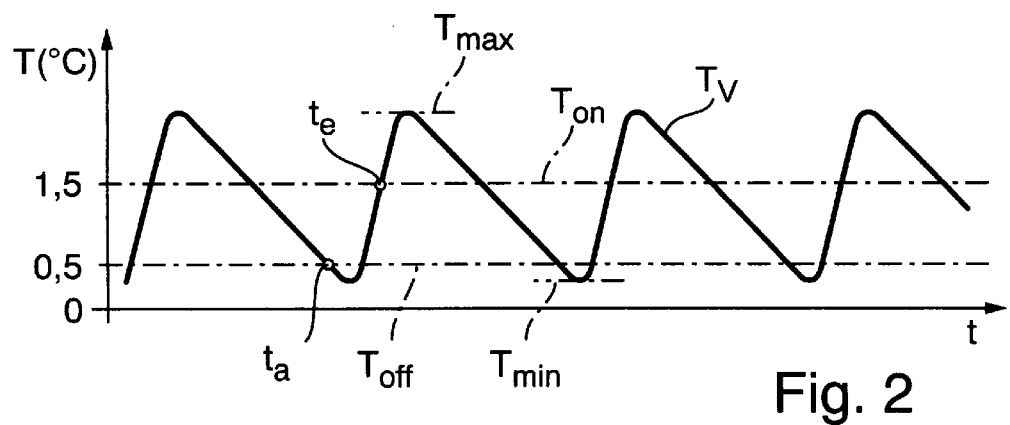
FIG. 2 is a diagram of evaporator temperature as a function of time illustrating a dynamic icing protection control at a high system load which can be implemented by the arrangement of FIG. 1.
Figure 3:
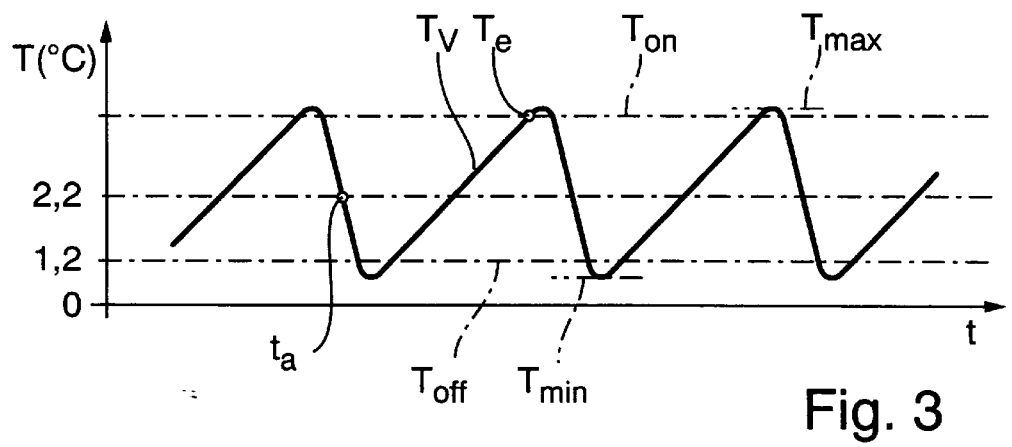
FIG. 3 is a diagram corresponding to FIG. 2 but for an operation with a low system load.

For this reason, a dynamic icing protection control with a corresponding adaptation of the switch-off temperature $T_{off}$ is advantageous as implemented by the control unit 1 in the present case. FIGS. 2 and 3 illustrate two typical operating phases with this dynamic icing protection control. FIG. 2 shows a case of a high system load and FIG. 3 shows a case of a low system load. In both cases, the evaporator temperature $T_v$ decreases or increases periodically corresponding to the periodical activating and deactivating of the compressor. As shown in FIG. 2, as a result of a high system load, the evaporator temperature $T_v$ rises comparatively fast during operating phases with a deactivated compressor and falls relatively slowly during active compressor operating phases. Inversely, as shown in FIG. 3, the evaporator temperature $T_v$, because of the low system load while the compressor is deactivated, rises relatively slowly and, while the compressor is activated, falls comparatively rapidly.

For operation at a high load according to FIG. 2, it can therefore be concluded that, after the switch-off of the compressor, the evaporator temperature $T_v$, before its rise, falls only very slightly to the minimum temperature $T_{min}$. The minimum temperature $T_{min}$ is situated relatively close to but below the switch-off temperature $T_{off}$. The invention utilizes this fact in that the switch-off temperature $T_{off}$ in this case can be placed such that it maintains only a relatively short distance from the icing point. In the example of FIG. 2, the switch-off temperature $T_{off}$ is set to only 0.5° C. Since the minimal temperature $T_{min}$ falls below the switch-off temperature $T_{off}$ at most by 0.1° C. to 0.2° C., there is no danger of icing-up. Simultaneously, the system capacity can be fully utilized. As an example, the switch-on temperature $T_{on}$, is fixed at 1.5° C.; that is, the switch-on hysteresis is 1° C. Because of the high system load, after activating the compressor at the respective switch-off point in time $t_e$, the evaporator temperature $T_v$ still noticeably fluctuates beyond the switch-on temperature $T_{on}$, until the refrigerating capacity of the system prevails. This means that the maximal temperature $T_{max}$ is noticeably above the switch-on temperature $T_{on}$ so that it is advantageous to keep the switch-on hysteresis comparatively low if larger fluctuations of the evaporator temperature $T_v$ are to be avoided.

In contrast, in the event of a low system load, as illustrated in FIG. 3, the evaporator temperature $T_v$, after the compressor switch-off, at a respective switch-off point in time $t_a$, will still noticeably decrease so that here the minimal temperature $T_{min}$ is situated farther below the switch-off temperature $t_{off}$ selected for this operation; in the case of FIG. 3, for example, the minimal temperature is approximately 0.8° C. lower than the switch-off temperature. In order to counteract any danger of icing-up of the evaporator here, the switch-off temperature $T_{off}$ is selected correspondingly high; for example, in the case of FIG. 3, the switch-off temperature is 1.2° C. As is shown in FIG. 3, the same switch-on hysteresis of 1° C. was maintained as in FIG. 2 so that the switch-on temperature $T_{on}$ is 2.2° C. Because of the low system load, during respective switching-on of the compressor, the evaporator temperature $T_v$ fluctuates at the switch-on point at time $t_e$ only slightly beyond the switch-on temperature $T_{on}$ and then falls relatively rapidly; in this case, the maximal temperature $T_{max}$ is only slightly, for example, by 0.1° C. to 0.2° C., above the switch-on temperature $T_{on}$.

As illustrated in FIGS. 2 and 3, the rate of increase of the evaporator temperature $T_v$ during operating phases with a deactivated compressor as well as the rate of decrease of the evaporator temperature while the compressor is activated is a clear measurement of the momentary system load and thus of the extent to which the minimal temperature $T_{min}$, is below the switch-off temperature $T_{off}$. The invention utilizes this fact for dynamically variably adjusting the switch-off temperature $T_{off}$ according to the situation. For this purpose, the control unit 1 analyzes the information concerning the evaporator temperature $T_v$ continuously supplied by the evaporator temperature sensor 2 and determines the evaporator temperature gradient $dT_v/dt$ of the time variation of the evaporator temperature $T_v$. The control unit analyzes this information specifically during operating phases with a deactivated compressor and/or during operating phases with an activated compressor. Then the control unit sets the switchoff temperature $T_{off}$ as a function of the determined evaporator temperature gradient $dT_v/dt$. Specifically, the switch-off temperature is set according to a functional relationship in which a higher switch-off temperature $T_{off}$ is selected as the positive evaporator temperature gradient $dT_v/dt$ gets lower during operating phases with a deactivated compressor and/or as the amount of the negative evaporator temperature gradient $dT_v/dt$ during operating phases with an activated compressor gets higher. The precise functional relationship between the switch-off temperature $T_{off}$ and the evaporator temperature gradient $dT_v$, must then be matched with the respective application while taking into account this condition. Matching is made, for example, by empirical tests before the system is first used.

As an alternative to the approach according to FIGS. 2 and 3, in which a constant switch-on hysteresis $T_H = T_{on} - T_{off}$ is provided, it is conceivable to also variably define the switch-on hysteresis $T_H$ as a function of the evaporator temperature gradient $dT_v/dt$ detected during operating phases with a deactivated and/or an activated compressor. In this case, the hysteresis distance $T_H$ is preferably selected to get larger as the positive evaporator temperature gradient $dT_v/dt$ gets lower during operating phases with a deactivated compressor or as the amount of negative evaporator temperature gradient $dT_v/dt$ gets larger during operating phases with an activated compressor including a lower switch-off temperature $T_{off}$. The larger switch-off hysteresis $T_H$ prevents an undesirably early switching-back-on of the compressor in the case of a lower system load which, in operations with a higher system load, has no disturbing effect because of the more slowly falling evaporator temperature $T_v$. As a result, it may be advantageous for the compressor to be switched back on earlier.

As demonstrated by the above-described embodiments, the invention therefore provides a true control for dynamic evaporator icing protection, in that the evaporator temperature information is utilized directly for dynamic adaptation at least of the switch-off temperature $T_{off}$ and, optionally; also of the switch-on temperature $T_{on}$, specifically in the form of the evaporator temperature gradient $dT_v/dt$ which is a measurement of the momentary system load which is reliable, clear and can be determined comparatively easily. The latter, in turn, determines how close the switch-off temperature $T_{off}$ can approach the evaporator icing point in order to, on the one hand, utilize the capacity of the air conditioner as fully as possible and, on the other hand, prevent any icing of the evaporator. Since most air conditioners already contain an evaporator temperature sensor, no increased hardware expenditures are required for implementing the invention. The control unit must only be designed with respect to the hardware and/or the software for the implementation of this process by determination of the evaporator temperature gradient $dT_v/dt$, determination of the switch-off temperature $T_{off}$ which is a function thereof, and optionally determination of the switch-on temperature $T_{on}$. As is clear from FIG. 1, this can be achieved by software or, as an alternative, by providing an analogous dynamic icing protection regulator with the corresponding functions.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for controlling an air conditioner with an evaporator protected against icing and a refrigerant circulating system which includes a compressor and an evaporator, comprising the steps of:

continually sensing an evaporator temperature, deactivating the compressor when the evaporator temperature falls below a defined switch-off temperature, activating the compressor again when the evaporator temperature exceeds a defined switch-on temperature which is higher than or equal to the switch-off temperature, determining an evaporator temperature gradient from continuously sensing the evaporator temperature during operating phases with a deactivated compressor and/or an activated compressor, and variably defining the switch-off temperature as a function of the evaporator temperature gradient determined so that the switch-off temperature is selected to rise with a falling negative evaporator temperature gradient during operating phases with an activated compressor and/or with a falling positive evaporator temperature gradient during operating phases with a deactivated compressor.

2. Process according to claim 1, and further comprising the steps of defining a hysteresis distance of the switch-on temperature from the switch-off temperature to be variable as a function of the evaporator temperature gradient determined, and selecting the hysteresis distance so as to rise with a negative evaporator temperature gradient, with an amount which increases, during operating phases with an activated compressor and/or with a falling positive evaporator temperature gradient during operating phases with a deactivated compressor.

3. Arrangement for controlling an air conditioner with an evaporator protected against icing and a refrigerant circulating system which includes a compressor and an evaporator, comprising:

an evaporator temperature sensor, and a control unit to which evaporator temperature information is supplied by the evaporator temperature sensor, which deactivates the compressor when the evaporator temperature falls below a defined switch-off temperature, and which activates the compressor again when the evaporator temperature exceeds a switch-on temperature which is at least equal to the switch-off temperature, wherein the control unit determines, from the continuously supplied evaporator temperature information, an evaporator temperature gradient during operating phases with a deactivated and/or activated compressor and variably defines the switch-off temperature as a function of the evaporator temperature gradient determined, said switch-off temperature rising with a falling negative evaporator temperature gradient during operating phases with an activated compressor and/or with a falling positive evaporator temperature gradient during operating phases with a deactivated compressor.

4. A control arrangement for an air conditioner including a refrigerant cooling system having a compressor and an evaporator, said control arrangement comprising:

a sensor which detects an evaporator temperature, and a control unit which determines an evaporator temperature gradient, deactivates the compressor when the evaporator temperature falls below a switch-off temperature to protect the evaporator against icing and activates the compressor again, after deactivation when the evaporator temperature falls below the switch-off temperature, when the evaporator temperature exceeds a switch-on temperature at least equal to the switch-off temperature, wherein said switch-off temperature is set as a function of the evaporator temperature gradient.

5. A control arrangement according to claim 4, wherein the control unit sets the switch-off temperature higher when the evaporator temperature gradient is low and positive.

6. A control arrangement according to claim 4, wherein the control unit sets the switch-off temperature higher when the evaporator temperature gradient is high and negative.

7. A control arrangement according to claim 4, wherein said control unit determines a switch-on hysteresis as a function of said evaporator temperature gradient.

8. A control arrangement according to claim 7, wherein said switch-on hysteresis gets larger as the evaporator temperature gradient gets lower when said compressor is deactivated and said gradient is positive.

9. A control arrangement according to claim 7, wherein said switch-on hysteresis gets larger as the evaporator temperature gradient gets larger when said compressor is activated and said gradient is negative.

10. A control process for an air conditioner including a refrigerant cooling system having a compressor and an evaporator, said control method comprising the steps of:

detecting an evaporator temperature, determining an evaporator temperature gradient, deactivating the compressor when the evaporator temperature falls below a switch-off temperature to protect the evaporator against icing and activating the compressor again, after deactivation when the evaporator temperature falls below the switch-off temperature, when the evaporator temperature exceeds a switch-on temperature at least equal to the switch-off temperature, and setting said switch-off temperature as a function of the evaporator temperature gradient.

11. A control process according to claim 10, wherein the switch-off temperature is set higher with decreasing positive evaporator temperature gradient.

12. A control process according to claim 10, wherein the switch-off temperature is set higher with falling negative evaporator temperature gradient.

13. A control process according to claim 10, wherein a switch-on hysteresis is defined as a function of said evaporator temperature gradient.

14. A control arrangement according to claim 13, wherein said switch-on hysteresis gets larger as the evaporator temperature gradient gets lower when said compressor is deactivated and said gradient is positive.

15. A control arrangement according to claim 13, wherein said switch-on hysteresis gets larger as the negative evaporator temperature gradient gets lower when said compressor is activated.

* * * * *